United States Patent [19]

Sallee

[11] Patent Number: 5,579,609
[45] Date of Patent: Dec. 3, 1996

[54] RIGIDIZABLE INFLATABLE STRUCTURE

[75] Inventor: Bradley T. Sallee, Austin, Tex.

[73] Assignee: Tracor, Inc., Austin, Tex.

[21] Appl. No.: 258,850

[22] Filed: Jun. 10, 1994

[51] Int. Cl.$^6$ ........................................ E04B 1/32
[52] U.S. Cl. .................. 52/2.11; 156/273.9; 156/156; 52/2.13; 52/2.15; 52/2.18
[58] Field of Search ................... 52/2.11, 2.13, 52/2.15, 2.18; 156/272.2, 273.9, 275.3, 275.5, 156

[56] References Cited

U.S. PATENT DOCUMENTS

| | | |
|---|---|---|
| 2,743,510 | 5/1956 | Mauney et al. . |
| 3,047,860 | 7/1962 | Swallow et al. . |
| 3,274,596 | 9/1966 | Raabe . |
| 3,277,479 | 10/1966 | Struble, Jr. . |
| 3,557,515 | 1/1971 | MacCracken . |
| 3,654,050 | 4/1972 | Fraser . |
| 3,668,287 | 6/1972 | Mackie . |
| 3,779,847 | 12/1973 | Turner ........................ 156/156 |
| 3,944,453 | 3/1976 | Chudgar et al. ............ 156/273.9 X |
| 3,945,867 | 3/1976 | Heller, Jr. et al. .......... 156/273.9 X |
| 4,005,168 | 1/1977 | Whitfill, Jr. et al. ........ 156/273.9 X |
| 4,132,577 | 1/1979 | Wintermantel ............ 156/156 |
| 4,155,967 | 5/1979 | South et al. ................. 52/2.15 X |
| 4,170,093 | 10/1979 | Cappellini et al. .......... 52/2.15 X |
| 4,288,947 | 9/1981 | Huang . |
| 4,302,266 | 11/1981 | Kutnyak ...................... 156/156 X |
| 4,341,578 | 7/1982 | Chermak et al. ........... 156/156 X |
| 4,583,330 | 4/1986 | Huang . |
| 5,242,517 | 9/1993 | Endoh ......................... 156/156 X |

FOREIGN PATENT DOCUMENTS 0089066 4/1957 Norway ..................... 52/2.15

Primary Examiner—Wynn Wood
Attorney, Agent, or Firm—Arnold, White & Durkee

[57] ABSTRACT

Novel structural members are provided that are flexible prior to being rigidized. The structural members are fabricated as bundles of reinforcing fibers commingled with binder materials, e.g. thermoplastic yarn, and a heat source. Means for compressing the bundle during deployment may also be provided. The structural members are rigidized by activating the heat source to melt the binder material, which flows throughout the bundle to bind the reinforcing fibers together, such that when the binder sets or hardens a rigid, reinforced structural member is provided. In preferred embodiments, these structural members are attached to an inflatable enclosure in a structural framework arrangement to form an inflatable structure. Such an inflatable structure may be rolled or folded into a compact space for storage and transport, such as into outer space. The structure may be deployed at a desired location by inflating the enclosure to stretch the structural member bundles into the desired configuration and actuating the heating elements to activate the binder material. After the binder has set, the structure is rigid and inflation pressure may be removed, leaving a rigidized enclosure or a reinforced structural member.

26 Claims, 7 Drawing Sheets

5,579,609

RIGIDIZABLE INFLATABLE STRUCTURE

FIELD OF THE INVENTION

The present invention relates generally to improved portable structural components for use on earth and in outer space. More specifically, the present invention relates to improved structural components for use as or in, for example, decoys, high gain antennas, and structural trusses in a space or missile environment, as well as for use to provide portable, rapidly deployable structures for terrestrial use such as shelters and antenna components. This invention is particularly well suited for terrestrial use in inaccessible or inhospitable environments.

DESCRIPTION OF THE RELATED ART

The fabrication and construction of components for use in a space environment or missile environment presents numerous difficulties not experienced in terrestrial-based construction. For example, the payload capacities of spacecraft and missiles are limited, structural components are often bulky and heavy, and conventional structural components are often subject to undesirable environmental degradation, such as, for example, perforation by micrometeorites.

Attempts at surmounting these and other problems have produced inflatable structures composed of thin metallic films or strands such as aluminum. The structures are typically rigidized by stressing the metallic material past its yield point thereby plastically deforming and setting the structural component. For example, rigidizable inflatable structures are known that are made from aluminum foil, which, when inflated beyond its yield point, becomes rigid enough to maintain its shape and bear a load when the inflation pressure is removed. U.S. Pat. No. 3,277,479 discloses a technique for creating rigid structural members by inflating a balloon-like sack having metallic (e.g. aluminum) wires or tapes attached thereto. The metallic elements may be stretched beyond their yield strength by the inflating sack, giving the metal elements a permanent, rigid set. The sack material may then be melted to form a plastic film around the metal members, forming a structural member for use in constructing a rigid structure. Such prior art overstressed metal approaches do not exhibit sufficient strength for many applications, particularly when the inflation pressure is removed. Furthermore, overstressed metal structures typically have low strength-to-weight ratios.

Various rigidizable plastic materials are known in the art, such as those described in U.S. Pat. Nos. 3,047,860, 3,557,515, 4,583,330, 4,288,947, and 3,779,847. However, the plastic materials of the prior art reached only 50% of their theoretical strength and only 80% of their theoretical stiffness. In addition, some of these rigidizable plastics had a limited shelf-life which is unacceptable due to the unpredictable schedules associated with space launches.

Other prior art structures use composite fibers to reinforce the inflatable structure. U.S. Pat. No. 3,654,050 discloses a method for construction of trusses and other structures for use in space using an inflatable core wrapped with glass fiber and impregnated with a gelatin solution. This structure may be inflated in space and rigidized by exposing the impregnate to a normal air or space environment, allowing it to harden. The structure may subsequently be collapsed by placing it in a moist environment to soften the impregnate. Such structures have medium strength-to-weight ratios, but are not susceptible to damage and deflation from damage caused by micrometeorites and space debris. An approach is needed that provides a rigid structure that does not rely on internal pressurization to maintain its structural integrity and that has an extremely high strength-to-weight ratio.

Known prior art inflatable structures also exhibit high panel flexibility. When used as a decoy, a structure with high panel flexibility is subject to energy dampening during spinning which decreases the control of the decoy. Such flexibility is also detrimental in antenna applications.

There is thus a need in the art for an easily deployable, high-strength rigidizable structure that retains its structural integrity without requiring continuous pressurization and that can be deployed without high pressure requirements for rigidization. There is a further need for such a structure having a high strength-to-weight ratio that is easily and compactly folded for storage and transport.

SUMMARY OF THE INVENTION

These and other requirements are addressed by the present invention that is described and claimed herein. The present invention provides improved rigidizable inflatable structures that exhibit the necessary pressure-independent strength when deployed, and that are lightweight, easily transported, and easily stored in small containers. Structures may be implemented with this invention to provide portable, quickly deployable shelters in remote areas, even where subject to snow, earth or wind loads. Structures may also be implemented with this invention for outer space applications, such as antenna support structures and enclosed structures. Furthermore, the structures made according to the present invention are easily deployed and erected by inflation at relatively low pressures, and are easily rigidized. Once rigidized, the structures made according to the present invention do not require continued internal pressurization to maintain their shape and rigidity.

In preferred embodiments, the present invention comprises an inflatable enclosure having a high strength-to-weight ratio and low gas permeability. The inflated shape of the enclosure is selected to be the desired shape of the structure. A means for inflating the enclosure during deployment is provided. Rigidizable members are bonded to the enclosure at intervals. These rigidizable members are arranged to form a structural framework to support the enclosure or other materials. A rigidizable member preferably comprises a bundle of reinforcing fibers commingled with binder materials, such as thermoplastic fibers or yarn, and a means for selectively heating the member. When the heating means is activated, the binder component melts and flows to surround and bond the reinforcing fibers into a rigid structural member when the binder cools and hardens. In preferred embodiments, means are provided for applying compressive force to the rigidizable member while the binder hardens. The compressive force produces a void-free, high-fiber content composite member. The heating means may comprise, for example, electric resistance heating elements or pyrotechnic elements.

After the rigidizable members are rigidized, they form a strong, rigid structural frame that can support the enclosure material after inflation pressure is removed. Portions of the enclosure or the frame may be cut away to yield any desired configuration. Doors or other perforations may be added. Large sections of an enclosure may be removed to form a canopy, as shown in FIG. 8e. Additional or alternative materials may be attached to and supported by the structural frame. This invention may be employed to construct and deploy a structural member for combination with other structural members or structures for use in a larger construction, such as a space station. For example, an elongated tubular member may be formed by methods described herein, as illustrated in FIG. 7.

The present invention therefore provides an improved method for forming structures that allows assemblies, including structural components, to be compactly stored and transported into space or terrestrial environments, particularly inhospitable terrestrial environments, and then quickly and easily deployed at a desired location. These and other advantages of the present invention will be further appreciated from the drawings and from the detailed description provided below.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiments thereof which are illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

FIG. 6b is a perspective cut-away view showing the components of the inflatable linear member of FIG. 6a.

DETAILED DESCRIPTION OF THE PREFERRED EMBODIMENTS

Figure 1:
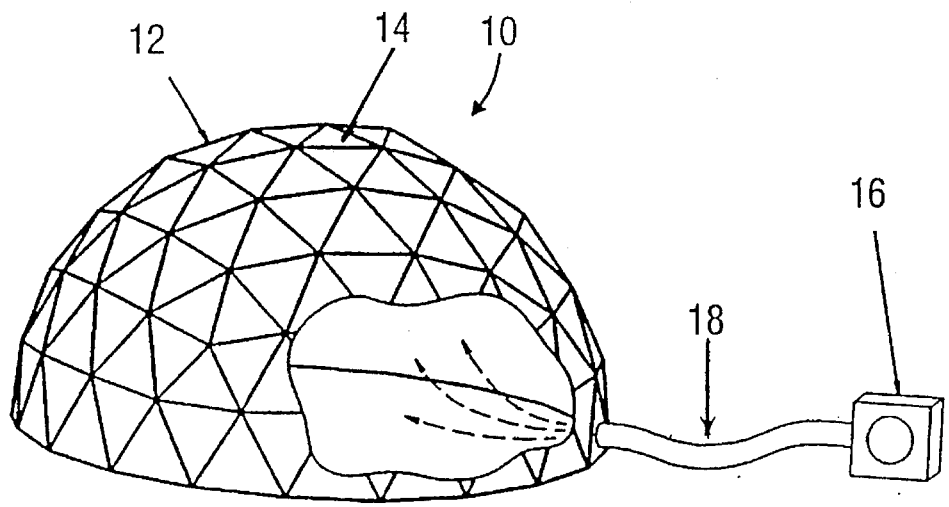
FIG. 1 illustrates the use of the present invention in forming an enclosed structure.

FIG. 1 shows a rigidized inflatable structure 10 in accordance with a preferred embodiment of this invention. The size and shape of the rigidized structure is substantially determined by an inflatable enclosure 12. The inflatable enclosure may be a single or multi-layer bag or balloon that is lightweight, that is capable of withstanding the inflation pressure and the binder's activation temperature (described below), and that has a high strength-to-weight ratio and low gas permeability. The inflatable enclosure may comprise, for example, MYLAR. KAPTON may also be used for making the inflatable enclosure as may other suitable materials. The enclosure is inflated by gas source 16 through conduit 18. Gas source 16 may comprise a fan, a pressurized gas bottle, a sublimation mechanism, or other mechanisms known in the art. The gas source may alternatively be located inside of the inflatable enclosure.

A space frame comprising rigidizable members 14 may be bonded to the inflatable enclosure 12. The rigidizable members 14 may be, for example, in any of the forms illustrated in FIGS. 2–5 and discussed below. In general, a rigidizable member comprises a plurality of reinforcing fibers commingled with a binder material surrounded by an outer sheath thereby providing compression during cooling/rigidization. The rigidizable members also contain a heat source, with a centralized heat source being particularly preferred. A rigidizable member is flexible (like a rope) in its manufactured condition before it is rigidized. Bonding between rigidizable members 14 and the inflatable enclosure 12 is preferably done at infrequent intervals and serves to position the fibers on the inflatable enclosure. Members 14 are preferably not continuously bonded to the inflatable component, so that a soft hand is provided during folding and inflation of structure 10. Bonding may be accomplished in any number of ways known in the art. For example, a low temperature epoxy or RTV silicone may be used.

Those skilled in the art will recognize that, depending upon the size and shape of the inflatable structure, the rigidizable members 14 may be bonded to the inflatable enclosure 12 in preferred orientations to maximize the strengthening effect of the rigid members that are provided by this invention. For example, in a spherical structure as shown in FIG. 1, it is known that use of a geodesic arrangement of supporting members provides strength and stability. For cylindrical structures, axial and radial fibers may be desirable to reinforce the structure. Alternatively, for tubular or cylindrical structures, ⅓ of the reinforcing members may be oriented along the longitudinal axis of the tubular structure, and ⅔ of the reinforcing members may be oriented at ±30° to the longitudinal axis.

In addition to Kevlar, the reinforcing fibers may also be made of glass, graphite, or other high strength, high temperature resisting fibers. For use in space structures the preferred fiber is KEVLAR, however it is envisioned that graphite may be added for increased stiffness. KEVLAR is also a preferred fiber for use in terrestrial structures although glass provides a low cost alternative by also having a good strength-to-weight ratio. For use as the outer sheath fibers in a tendon braid are preferred, however, heat-shrink tubing may also be used.

Figure 2:
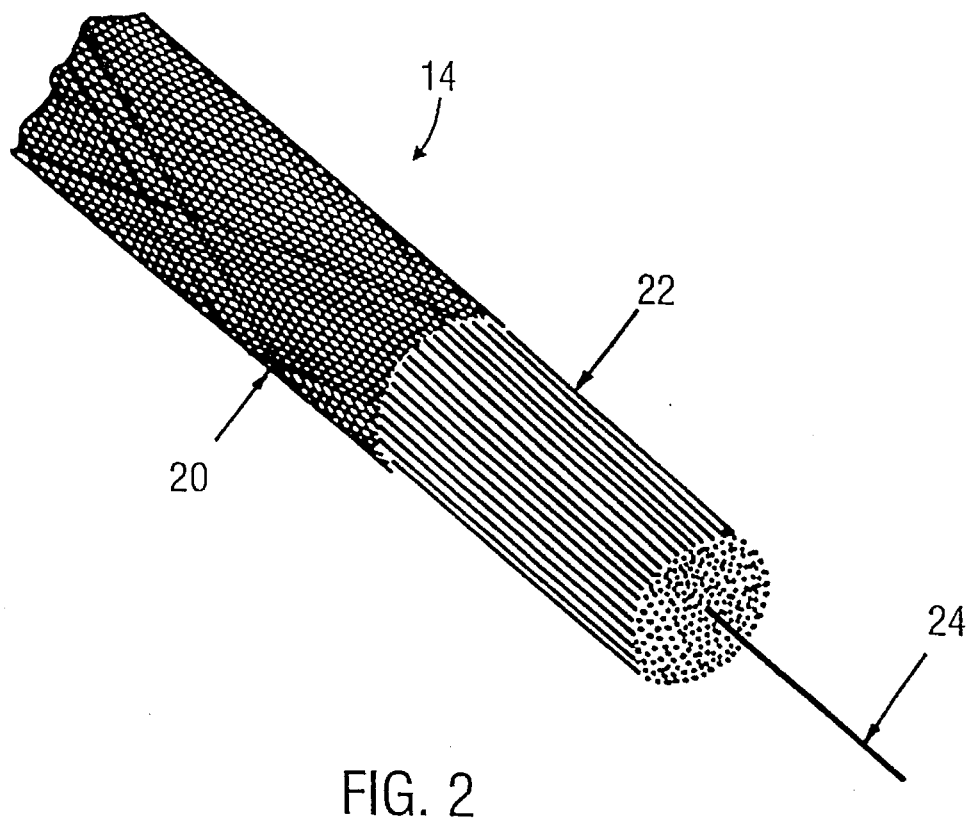
FIG. 2 is a perspective view of an embodiment of the present invention having a braided outer sheath and an electric heating element.

FIG. 2 shows an embodiment of a rigidizable member 14 according to the present invention. Rigidizable member 14 typically comprises outer sheath 20, fiber bundle 22, and heating element 24. Fiber bundle 22 comprises reinforcing fibers and binder material that may be selectively activated to bond the fibers to one another to rigidize the member. In preferred embodiments, the binder is in the form of thermoplastic fibers or yarns that are commingled with the reinforcing fibers. The binder is activated by heat provided by heating element 24. In preferred embodiments, the binder may be any of a number of known thermoplastics, such as nylon, PEEK, polyethylene or polypropylene. In a preferred embodiment, high temperature thermoplastic fibers are interspersed with Kevlar reinforcing fibers. Nylon and PEEK are preferable binder materials due to their unlimited shelf life and high strength to weight performance. These materials can be manufactured in the form of a flexible yarn to facilitate folding and packing the inflatable structure.

Heating element 24 is provided for heating the bundle 22, including the binder material (e.g. thermoplastic fibers) after the inflatable enclosure 12 is inflated. In preferred embodiments, the binder material is provided in the form of thermoplastic fibers or yarns dispersed within fiber bundle 22, and the heating elements 24 are disposed proximate the binder elements and designed to provide enough heat to melt the binder material. The heating element 24 may be activated by means known in the art, depending upon the type of heating element chosen for a particular application. Electric resistance elements (e.g., nychrome wire) may be activated by causing electric current to flow through them. Pyrotechnic fuse-type heating elements may be ignited by ignition methods that are well known in the art.

Figure 5:
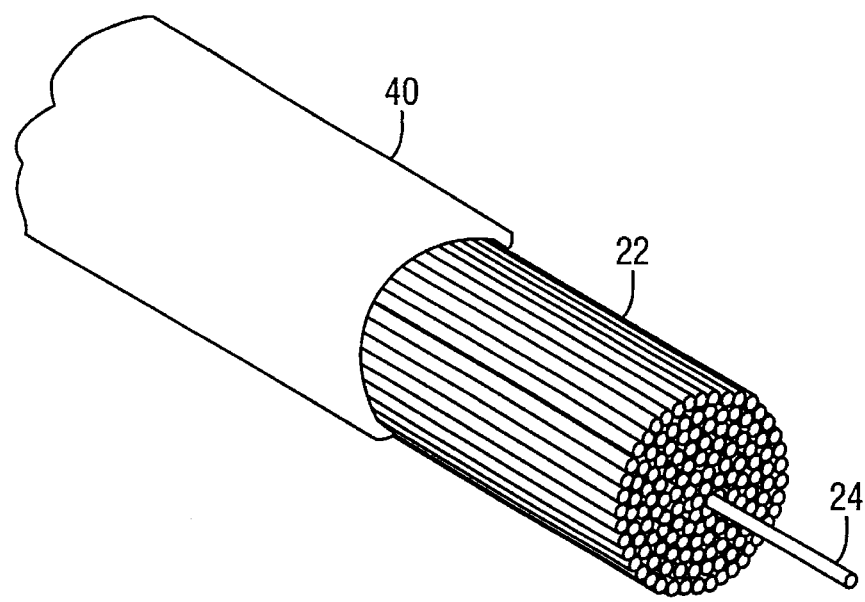
FIG. 5 is a perspective view of an embodiment of the present invention having an outer sheath made of heat shrinkable tubing.

The outer sheath 20 is made up of either a braid, as shown in FIG. 2, or a heat shrink sheath (40 in FIG. 5). The outer sheath serves to compress the fiber bundle during heating, thereby providing a compressive force similar in nature to autoclave pressure. The pressure provided by the outer sheath is essential to producing and maximizing the theoretical strength and stiffness of high performance composite structures, thereby attaining a high strength-to-weight ratio.

Once fabricated, the rigidizable inflatable structure 10 is easily folded and stored for transport in its uninflated, prerigidized condition. Deployment and erection is accomplished by first inflating the inflatable enclosure 10 using gas source 16. Any of several commonly known inflation techniques, such as using compressed gas or sublimating compounds, can be used to inflate the enclosure. After the enclosure 12 is inflated and the rigidizable elements 14 are stretched into position, the heating elements 24 are activated. The increasing temperature causes the binder material to melt and flow into and around the reinforcing fibers. The outer sheath contracts during heating, compressing the intersticial voids out of the molten binder, thereby forcing the binder and reinforcement fiber into a compact rod.

In embodiments with permeable outer sheaths, the binder may be allowed to flow onto the inflatable enclosure, thus helping to bond the rigidizable member 14 to the enclosure material. Depending on the size of the structure and the temperature necessary to activate the binder, a pressure relief valve (not shown) may be necessary in the inflatable enclosure 12 to deal with increasing pressure caused by increasing temperature. The heating elements remain active for a time sufficient to allow the binder to melt and flow around the fibers. The heating elements are then deactivated or allowed to expire and the rigidizable member 14 is allowed to cool. The cooling or setting binder strengthens and sets the reinforcing fibers, thus forming the rigidized inflatable structure. Inflation pressure can be removed from the rigidized structure, producing a structure that will not be susceptible to deflation due to damage from micrometeorites or other puncturing events.

Referring to FIG. 2, in preferred embodiments, bundle 22 of reinforcing fibers (such as KEVLAR) and thermoplastic fibers (such as nylon) are disposed within an overbraid sheath 20 (in this case made of KEVLAR) to form rigidizable member 14. Application of tensile force to the rigidizable member 14 causes the overbraid sheath 20 to apply compressive forces to the fiber bundle 22 contained therein, in the manner of the familiar "Chinese finger puzzle". Heat may then be applied to such a reinforcing bundle by linear heat source 24 disposed within the cable, such as an electric heating element or a pyrotechnic fuse. When inflatable enclosure 12 is inflated and heat source 24 is activated, the compressed reinforcing fibers and the molten thermoplastic (from the melted thermoplastic fibers that were commingled with the reinforcing fibers inside the sheath 20) are squeezed together by the overbraid sheath 20 to form a dense structure. The heat source 24 is then deactivated (or exhausts itself) and the thermoplastic solidifies in the interstices between the reinforcing fibers to form a fiber reinforced thermoplastic rod. It is generally sufficient to apply the heat for only several seconds.

Figure 3:
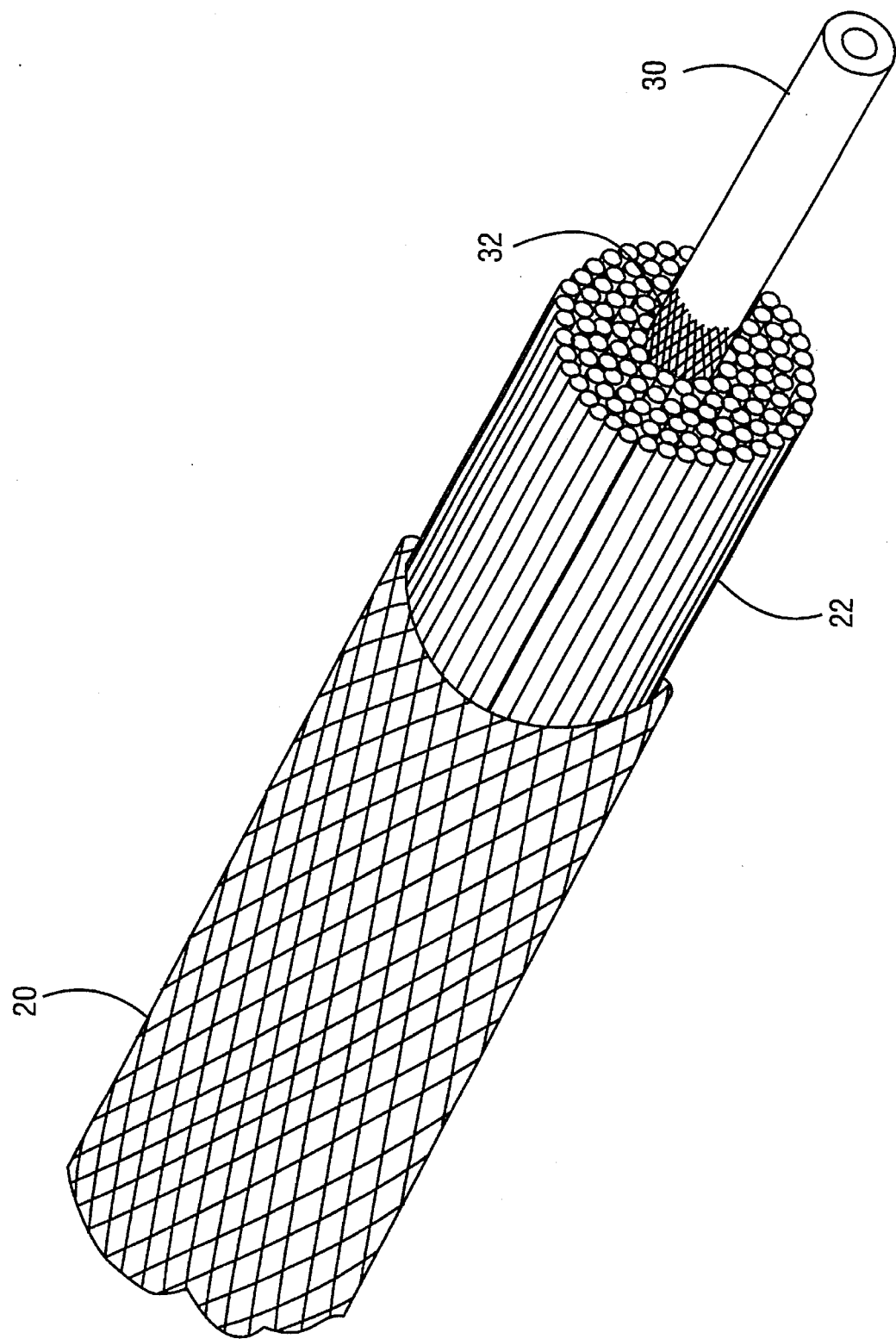
FIG. 3 is a perspective view of an embodiment of the present invention having a braided outer sheath and a pyrotechnic heating element.
Figure 4:
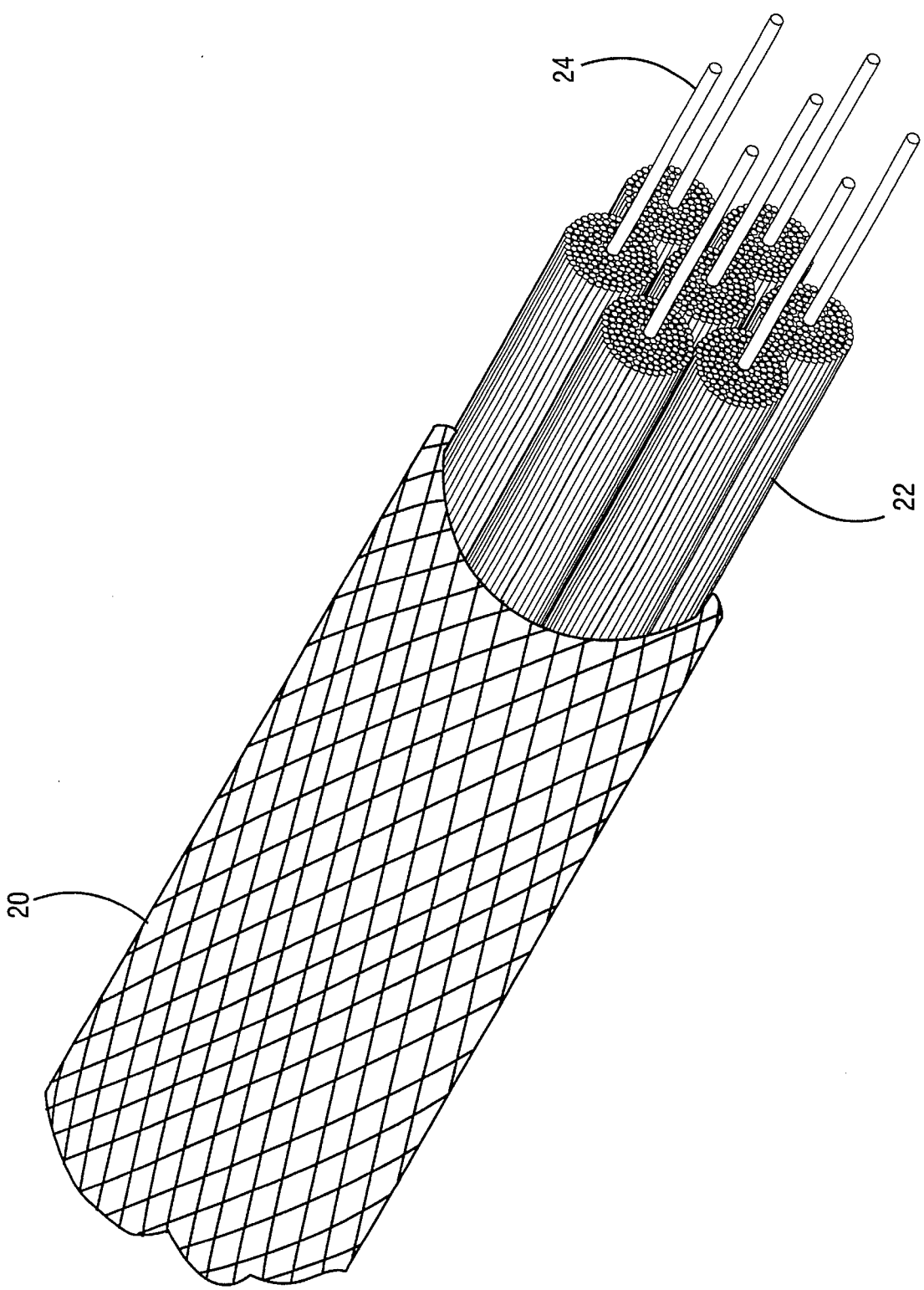
FIG. 4 is a perspective view of an embodiment of the present invention comprising a plurality of groups of reinforcing and binder fibers within a braided outer sheath.

The commingled reinforcing (e.g. KEVLAR) and thermoplastic (e.g. nylon) fibers may be formed into a single cylindrical bundle covered by a sheath, as shown in FIGS. 2 and 3. Alternatively, the commingled fibers may be formed into a number of separate bundles that are then gathered or twisted into a cable that is covered by a common sheath, as is illustrated in FIG. 4. This is particularly preferred for bundles having wider diameters thereby providing for heat transfer that is more evenly distributed. One such example are rods having a large diameter, defined herein as having about an ⅛ inch diameter or larger per bundle.

In another alternative embodiment (referring to FIG. 5), a rigidizable member can be constructed of fiber bundle 22, comprising reinforcing fibers, thermoplastic yarn and a heat source 24, contained within an outer sheath of heat shrinkable tubing 40. The heat shrinkable tubing 40 provides compressive forces to squeeze the reinforcing fibers and the molten thermoplastic together when the heating element is activated. The heat shrinkable tubing 40 serves the additional function of providing an impermeable sheath to prevent out-gassing during the thermoplastic cure cycle. Both the overbraid sheath (FIG. 2) and the heat shrinkable tubing sheath (FIG. 5) provide an autoclave effect when combined with heat to provide favorable conditions for forming reinforced thermoplastic structures.

The type of heat source to use is a design choice that may be made from among a number of alternatives known in the art. For example, the heat source may comprise an electric resistance heating element, or a pyrotechnic-type heat source such as, for example, a non-outgassing chemical element such as thermite or "PYROFUSE"-type fuse material. A designer of a particular application for this invention may select a heat source based on heat requirements, power availability, cost, reliability and other considerations.

FIG. 3 shows an embodiment of a rigidizable member according to the present invention having a pyrotechnic-type heat source. Outer sheath 20, which may be made of braided Kevlar, contains fiber bundle 22, as described above, and pyrotechnic core heat source 30. This type of heat source may have a containment wrap 32. The pyrotechnic heat source may be of the "small column insulated delay" type (SCID). In use, such a rigidizable member may be attached to an inflatable enclosure and folded into a container with the inflatable enclosure. The structure may be deployed by inflating the enclosure, which straightens and stretches each rigidizable member into its desired permanent position. Tensile forces thus applied to the rigidizable member cause braided sheath 20 to compress its contents. Heat source 30 is then ignited to generate heat sufficient to melt the binder components so that they can flow around the reinforcing fibers. After the heat source 30 is exhausted (or deactivated), the binder cools and hardens to form reinforced rigid members.

FIG. 4 illustrates an embodiment wherein several fiber bundles 22 are encased within a single outer sheath 20. Each fiber bundle 22 may contain a linear heat source 24. This embodiment is useful in situations where the size of the rigidizable member requires more than one heat source to melt the thermoplastic components. Upon activation of the heat source, the compressive force generated by braided sheath 20 cause all of the fiber bundles to join to form a single, larger diameter rigid member. For example, a single-bundle embodiment, as shown in FIG. 2, may be used to form a rigid member approximately, for example, ¼ inch in diameter. A multi-bundle embodiment, shown in FIG. 4, may form a rigid member having a diameter of, for example, ½ to ¾ inch.

Figure 6B:
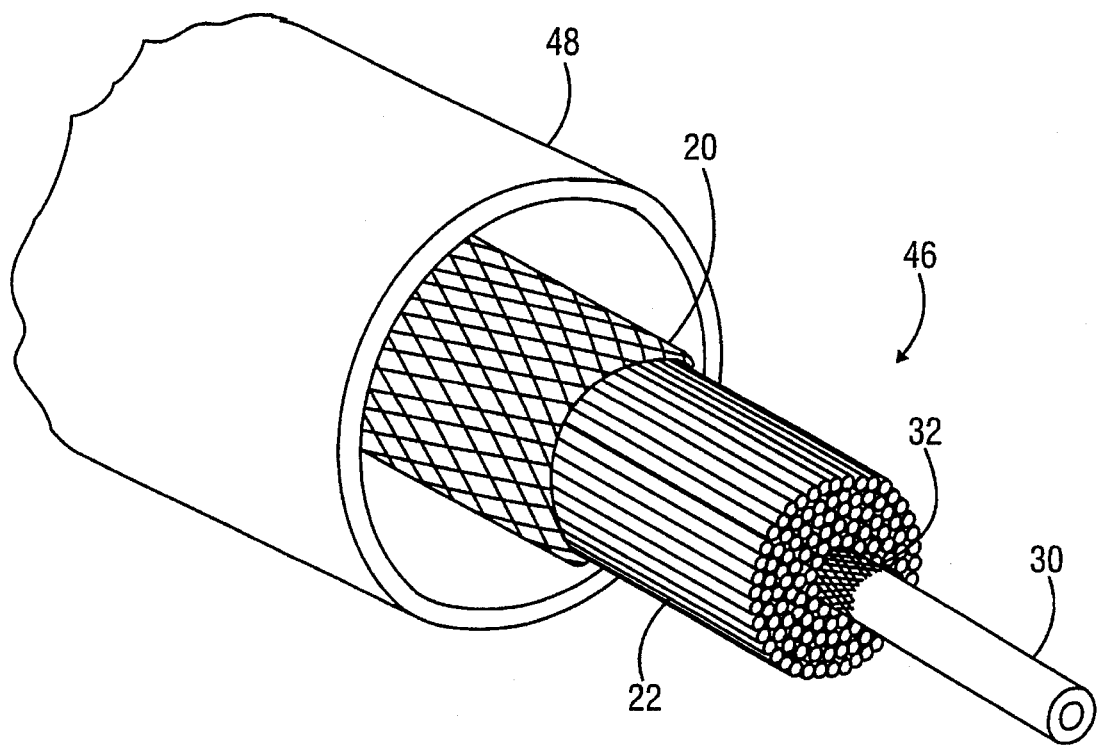
Figure 6A:
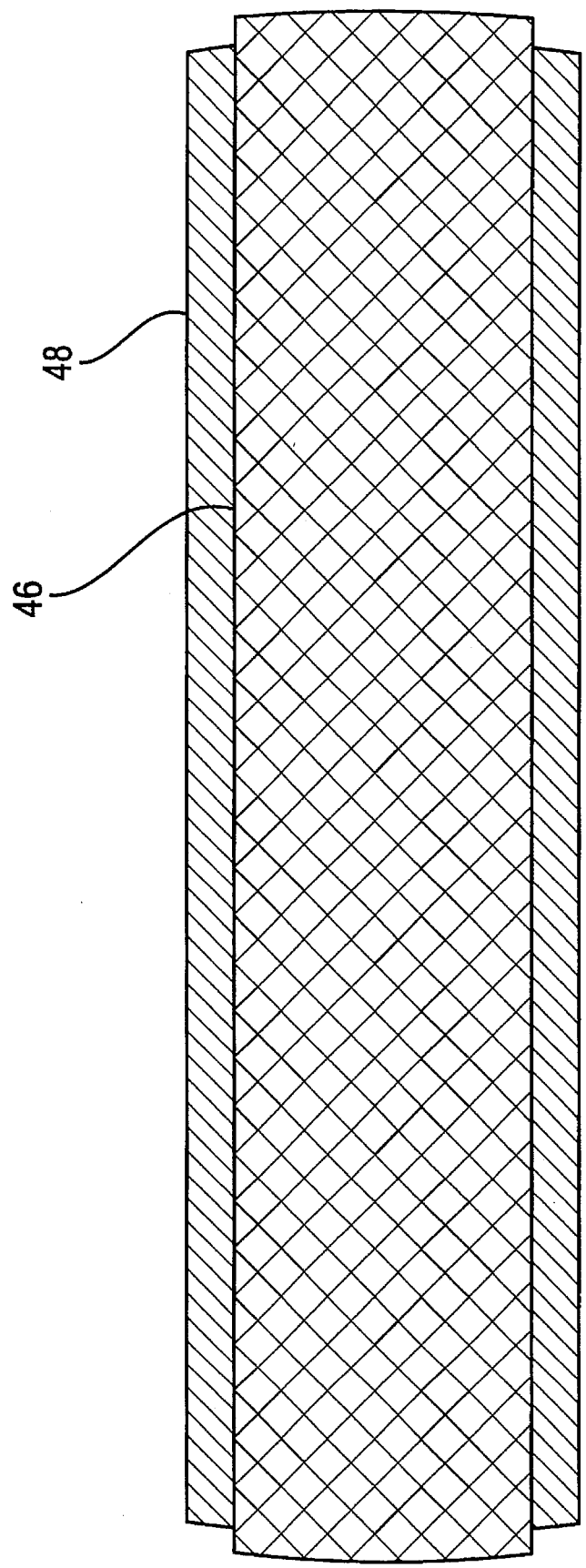
FIG. 6a is a diagrammatic view of an inflatable linear member according to the present invention.

Rigidized structures may be formed with this invention even if the entire structure cannot be inflated to straighten and tension the rigidizable members during deployment. In such situations, a rigidizable member may be associated with one or more inflatable tubes that provide shape and tension to the member during deployment. For example, as shown in FIGS. 6a and 6b, rigidizable member 46 may be connected at both ends to inflatable tube 48 and contained within tube 48. Rigidizable member 46 may be similar to those illustrated in FIGS. 2–5. Rigidizable member 46 may be deployed by inflating tube 48 and activating heating element 30. Such individual rigidizable members may be connected as desired to form a rigid structure.

Figure 7:
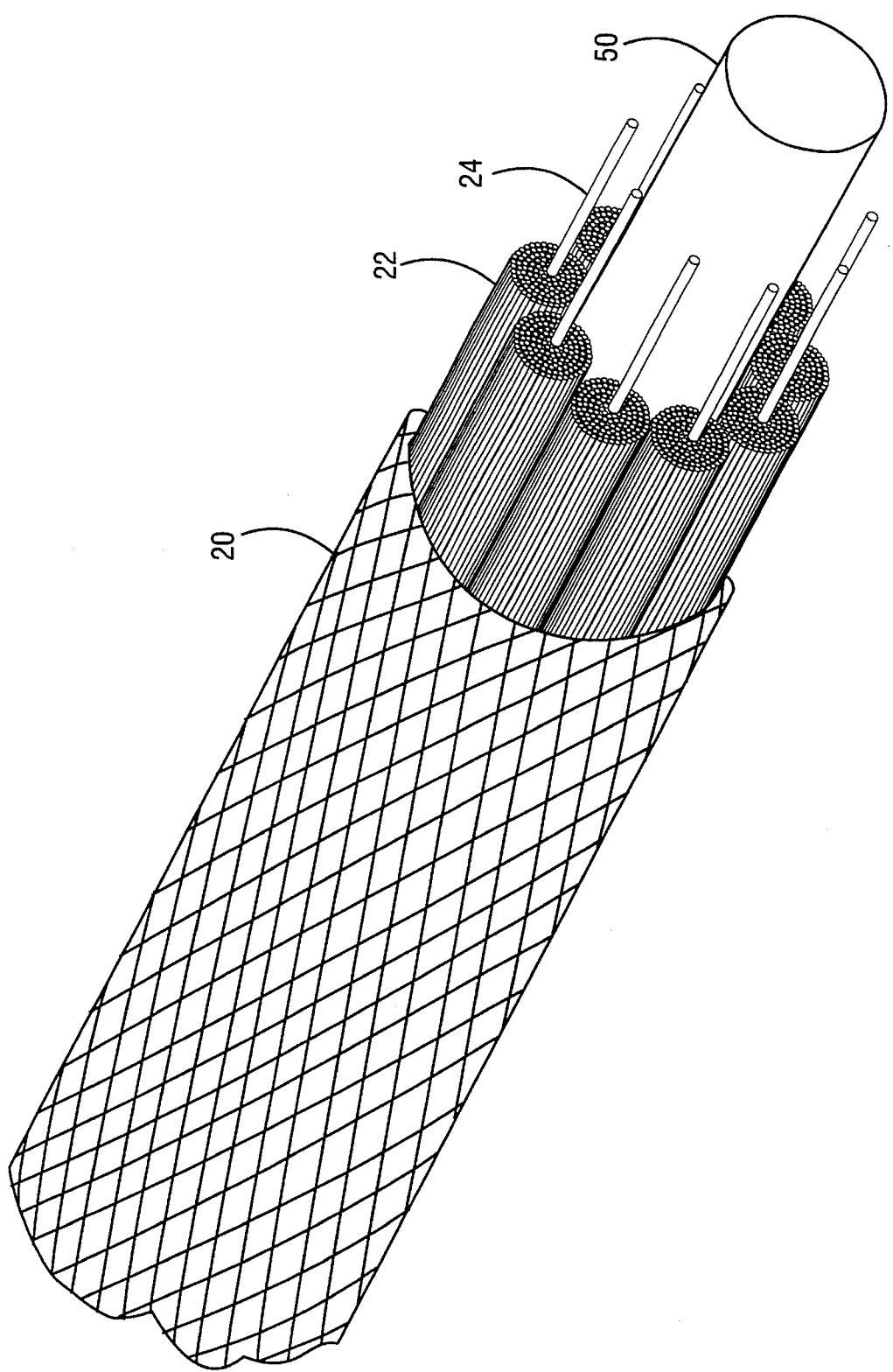
FIG. 7 is a cut-away perspective view of a tubular member that is formed according to the present invention.

FIG. 7 shows another way that the rigidizable members of this invention can be used to form a structural beam, which can be connected to other structural components. Fiber bundles 22 are arranged around the periphery of an inflatable bladder 50, and a braided sheath 20 surrounds the fiber bundles 22. Heat sources 24 may be positioned in each fiber bundle. Bladder 50 may take the form of an elongated, tubular balloon, which may be made of, for example, MYLAR or KAPTON. Alternatively, the heat source may comprise a heating grid manufactured on the surface of bladder 50 using, for example, flex circuit techniques (not shown). In the embodiment illustrated in FIG. 7, the rigid beam is deployed by inflating bladder 50, which straightens and applies tension to the fiber bundles 22 and the sheath 20, causing sheath 20 to compress the fiber bundles 22 around the bladder. The heat sources 24 are then activated, causing the thermoplastic components in the fiber bundles 22 to melt and flow to fill the interstices between the reinforcing fibers inside of the sheath 20. As the heat dissipates, the thermoplastic hardens and a reinforced tubular beam is formed. In preferred embodiments, this technique may be used to form a beam from, for example, ½ inch to 4 inches in diameter.

The type of heat source used is not critical to operation of this invention. As described above, the heat source may be positioned in the fiber bundle, or it may be positioned on the surface of an inflatable bladder or enclosure. Alternatively, a heat source may be wrapped around the outside of a fiber bundle or a group of fiber bundles, or it may be incorporated into the outer sheath.

Figure 8A:
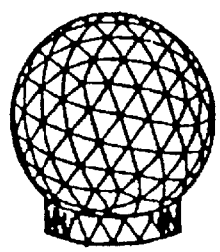
FIGS. 8a–8e illustrate exemplary structures that can be formed utilizing the present invention.
Figure 8B:
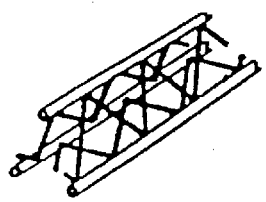
Figure 8C:
Figure 8D:
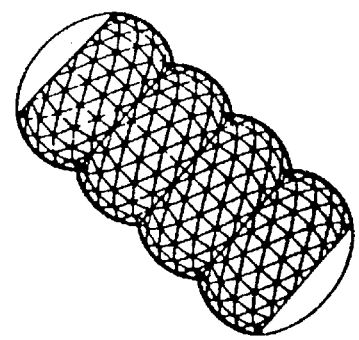
Figure 8E:
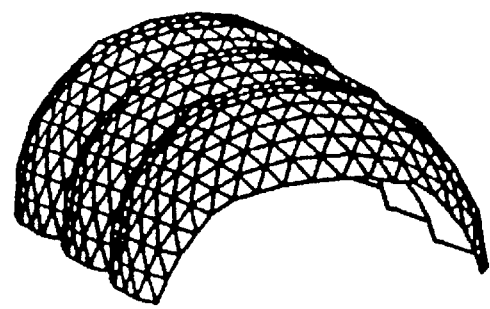

FIGS. 8a–8e illustrate exemplary applications for the present invention. FIG. 8a shows a spherical enclosure, such as for a radar installation. Such an enclosure can be formed by constructing an inflatable enclosure of the desired size and shape and attaching rigidizable members to the external surface of the enclosure in a geodesic configuration. The rigidizable members may alternatively be positioned inside of the inflatable enclosure. Once the members are rigidized they form a rigid structural frame that can support the enclosure material. FIG. 8b shows a composite beam that may be constructed using, for example, the embodiments illustrated in FIGS. 6 and 7 for forming elongated structural members. Many types of structural elements may be formed according to this invention by designing appropriate combinations of fiber bundles, and by providing inflatable constructions to stretch the fiber bundles into position for deployment and rigidization. FIGS. 8c and 8d show hemispherical and tubular structures that may be formed in a manner similar to that described for FIG. 8a, above. FIG. 8e shows a canopy structure that could be formed in a number of ways using the present invention. First, individual beams (or groups of connected beams) may be fabricated as discussed with respect to FIGS. 6 and 7, above, and interconnected together, such that before rigidization the structure is formed from a network of connected inflated tubes. Second, an inflatable enclosure can be constructed as was described with respect to FIG. 8a, with rigidizable members attached to the enclosure. After rigidization, the ends and bottom of the enclosure can be cut away, leaving the canopy as illustrated. Structures such as those illustrated in FIGS. 8a–8e can be constructed in sizes spanning several orders of magnitude. For example, the canopy of FIG. 8e may be used to provide a small personal shelter, and it may also be used to construct a rapidly deployable aircraft hangar. These exemplary structures, illustrated in FIGS. 8a–8e, are intended only to aid in understanding the use of the invention, and are not to be construed as limiting the scope of the claims of this patent.

Further modifications and alternative embodiments of this invention will be apparent to those skilled in the art in view of this description. Accordingly, this description is to be construed as illustrative only and is for the purpose of teaching a person skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A rigidizable inflatable structure, comprising:
   an inflatable enclosure formed in substantially the desired size and shape of the structure;
   a space frame bonded to the enclosure and comprised of at least one rod, said rod further comprising:
   reinforcing fibers contained within an outer contracting sheath, designed to compress the reinforcing fibers and binder during curing and connected to the inflatable enclosure;
   a binder commingled with the reinforcing fibers; and
   a heating element disposed proximate the binder for activating the binder to rigidize the structure.

2. A rigidizable inflatable structure according to claim 1 wherein the reinforcing fibers comprise KEVLAR.

3. A rigidizable inflatable structure according to claim 1 wherein the binder comprises thermoplastic fibers.

4. A rigidizable inflatable structure according to claim 1 wherein the inflatable enclosure comprises MYLAR.

5. A rigidizable inflatable structure according to claim 1 wherein the inflatable enclosure comprises KAPTON.

6. A rigidizable inflatable structure according to claim 1, wherein the outer sheath is adapted to compress the fibers after the binder is activated.

7. A rigidizable inflatable structure according to claim 1, wherein the outer sheath is braided such that the bundle is compressed by the outer sheath when the bundle is stretched by an inflation event.

8. A rigidizable inflatable structure according to claim 1, wherein the outer sheath comprises heat shrinkable tubing which compresses the reinforcing fibers and binder as the tubing shrinks.

9. A rigidizable inflatable structure according to claim 1 wherein the heating element comprises an electric resistance element.

10. A rigidizable inflatable structure according to claim 1 wherein the heating element comprises pyrotechnic fuse material.

11. A rigidizable inflatable structure, comprising:
   an inflatable enclosure; and
   a rigidizable member bonded to the enclosure, the rigidizable member further comprising:
     a bundle of reinforcing fibers;
     binder material;
     a heating element; and
     a contracting outer sheath containing the fibers and the binder, wherein the outer sheath is designed to compress the fibers and binder during binder activation.

12. A rigidizable inflatable structure according to claim 11 wherein the reinforcing fibers comprise KEVLAR.

13. A rigidizable inflatable structure according to claim 11 wherein the binder comprises thermoplastic fibers.

14. A rigidizable inflatable structure according to claim 11 wherein the inflatable enclosure comprises MYLAR.

15. A rigidizable inflatable structure according to claim 11 wherein the inflatable enclosure comprises KAPTON.

16. A rigidizable inflatable structure according to claim 11, wherein the outer sheath is adapted to compress the fibers when the enclosure is inflated.

17. A rigidizable inflatable structure according to claim 11, wherein the outer sheath is braided such that the bundle is compressed by the outer sheath when the bundle is stretched.

18. A rigidizable inflatable structure according to claim 11, wherein the outer sheath comprises heat shrinkable tubing which compresses the reinforcing fibers and binder as the tubing shrinks.

19. A rigidizable inflatable structure according to claim 11 wherein the heating element comprises an electric resistance element.

20. A rigidizable inflatable structure according to claim 11 wherein the heating element comprises pyrotechnic fuse material.

21. A rigidizable inflatable structure comprising:
   an inflatable enclosure formed in substantially the desired size and shape of the structure;
   means for inflating the inflatable enclosure;
   bundles of reinforcing fibers bonded to the inflatable enclosure;
   a heat activated binder commingled with the reinforcing fibers;
   an electrical resistance heating element to activate the binder so as to rigidize the bundles of reinforcing fibers; and
   means for compressing the bundles after the binder is activated.

22. A method for deploying a construction having a rigid supporting structure, comprising:
   providing an inflatable enclosure formed in substantially the size and shape of the desired construction, at least one bundle of reinforcing fibers contained within a sheath and coupled to the inflatable enclosure, a heat activated binder material commingled with the reinforcing fibers, and means for producing heat to activate the binder;
   inflating the inflatable enclosure;
   actuating the heat producing means to produce heat sufficient to activate the binder to cause it to flow around the reinforcing fibers; and
   deactivating the heat producing means so as to set the binder and rigidize the bundles of reinforcing fibers.

23. The method of claim 22, wherein the actuating step comprises actuating an electrical heating element.

24. The method of claim 22, wherein the actuating step comprises triggering a pyrotechnic heating element.

25. The method of claim 22, further comprising providing a braided outer sheath around the at least one bundle of reinforcing fibers, and wherein the inflating step includes stretching the braided outer sheath so as to compress the reinforcing fibers within the sheath when the binder is activated.

26. A rigidizable inflatable structure comprising:
   an inflatable enclosure formed in substantially the desired size and shape of the structure;
   means for inflating the inflatable structure;
   bundles of reinforcing fibers coupled to the inflatable enclosure;
   a heat activated binder commingled with the reinforcing fibers;
   a non-outgassing chemical heating element to activate the binder so as to rigidize the bundles of reinforcing fibers; and
   means for compressing the bundles after the binder is activated.

* * * * *